United States Patent
Dashiff et al.

[19]

[11] Patent Number: 5,999,539
[45] Date of Patent: Dec. 7, 1999

[54] APPARATUS FOR UTILIZING SPARE T1 DS0 CHANNELS IN E1 INVERSE-MULTIPLEXED CHANNELS

[75] Inventors: Ethan I. Dashiff, Passaic; Victoria Y. Jin, Aberdeen; Lucy Ann Tscherne, Madison, all of N.J.

[73] Assignee: AT&T Corp., New York, N.Y.

[21] Appl. No.: 09/207,328

[22] Filed: Dec. 7, 1998

Related U.S. Application Data

[63] Continuation of application No. 08/847,950, Apr. 24, 1997.

[51] Int. Cl.$^6$ ................................ H04J 3/16; H04J 3/22; H04J 3/04
[52] U.S. Cl. .......................................... 370/465; 370/535
[58] Field of Search ..................... 370/465, 464, 370/466, 467, 366, 532, 535, 537, 540, 470, 472, 476, 536, 541, 542, 916, 437

[56] References Cited

U.S. PATENT DOCUMENTS

| | | | |
|---|---|---|---|
| 4,589,108 | 5/1986 | Billy | 370/535 |
| 4,595,907 | 6/1986 | Huffman et al. | 370/536 |
| 4,661,946 | 4/1987 | Takahashi et al. | 370/378 |
| 5,452,306 | 9/1995 | Turudic et al. | 370/465 |
| 5,526,397 | 6/1996 | Lohman | 370/477 |
| 5,799,019 | 8/1998 | Kim et al. | 370/465 |

*Primary Examiner*—Chi H. Pham
*Assistant Examiner*—Steven Nguyen

[57] ABSTRACT

In situations where 2.048 megabit E1 (32 channels) access to the customer premise is not available, the only option other than provisioning a 45 megabit T3 line to the customer premise is to provision two 1.544 megabit T1 (24 channels) lines, and inverse multiplex the customer's E1 signal onto the two T1 lines at the customer premises. At the network point-of-presence (POP), the applicable thirty-two channels of the two T1 lines are remultiplexed onto a single E1 line. The remaining sixteen channels of the two T1s are wasted. To prevent wasting these channels, the present invention provides an additional standard customer interface to enable transport of multiple 64 kilobit applications. The resulting N×64 kbit data stream can then be multiplexed onto the two T1 lines transporting the E1 signal. The inverse multiplexer at the network point-of-presence (POP), while remultiplexing the 32 T1 channels onto an E1 line, also extracts the DS0s carrying the N×64 kbit customer payload and provides these DS0s a G.703 compliant network interface for multiplexing onto T1 or T3 lines for transport over the network.

1 Claim, 1 Drawing Sheet

APPARATUS FOR UTILIZING SPARE T1 DS0 CHANNELS IN E1 INVERSE-MULTIPLEXED CHANNELS

This application is a continuation of Ser. No. 08/847,950 filed Apr. 24, 1997.

BACKGROUND OF THE INVENTION

The present invention relates generally to multiplexing systems more particularly to a multiplexing system that provides a customer specified interface while using T1 lines to the customer premises.

The most popular U.S. standard interface for customer premises telecommunications equipment is a T1 line, which carries 24 channels at 64 kbits per second for a total of 1.544 Mbits per second. This is known as a T1 interface. In Europe, the most popular standard interface for customer premises equipment is a E1 line, which carries 32 channels at 2.048 Mbits per second. This is called an E1 interface.

In some cases, customers in the United States request E1 interfaces to their customer premise equipment. Currently, to meet this request, two T1 lines are provisioned directly to the customer premises, and a T1-to-E1 multiplexer/inverse multiplexer (MUX/IMUX) located on the customer premises interfaces to another MUX/IMUX located at the interexchange carrier's network point-of-presence (POP). As a result, 48 channels are set aside for communications to the customer premises, but only 32 are used. Consequently, 16 channels are wasted.

The present invention is therefore directed to the problem of developing a method and system for utilizing the unused channels without adversely impacting the existing setup.

SUMMARY OF THE INVENTION

The present invention solves this problem by providing an additional standard customer interface to enable transport of multiple 64 kilobit applications. The resulting N×64 kbit data stream can then be multiplexed onto the two T1 lines transporting the E1 signal. The inverse multiplexer at the network point of presence (POP) receives 32 channels spread among the available 48 channels, remultiplexes the 32 channels into an E1 format for placement onto an E1 line, extracts the DS0s carrying the N×64 kbit customer payload and provides a standard network line interface (e.g. G.703) for multiplexing onto T1 or T3 lines for transport over the network.

According to the present invention, a multiplexer/inverse multiplexer for providing a thirty-two channel telecommunications interface to a customer using two twenty-four channel telecommunication interfaces from a telephone network includes a first twenty-four channel interface, a second twenty-four channel interface, a thirty-two channel interface, and at least one standard user serial interface. The multiplexer/inverse multiplexer receives a first plurality of channels at the thirty-two channel interface in a thirty-two channel format, forms a second and third plurality of channels from the first plurality of channels, and couples the second and third plurality of channels to the first and second twenty-four channel interfaces, respectively. The multiplexer/inverse multiplexer also receives a fourth and fifth plurality of channels at the first and second twenty-four channel interfaces, respectively, forms a sixth plurality of channels from the fourth and fifth plurality of channels and couples the sixth plurality of channels to the thirty-two channel interface. In addition, the multiplexer/inverse multiplexer demultiplexes at least one user channel from the second and third plurality of channels received at the first and second twenty-four channel interfaces, respectively, and couples the at least one user channel to the at least one standard user serial interface and multiplexes at least one user channel received at the at least one standard user serial interface with either the second or third plurality of channels.

According to the present invention, a multiplexer/inverse multiplexer for providing a thirty-two channel telecommunications interface to a telephone network using two twenty-four channel telecommunication interfaces from a customer premises includes a first twenty-four channel interface, a second twenty-four channel interface, a thirty-two channel interface, and at least one standard network line interface. The multiplexer/inverse multiplexer receives a first plurality of channels at the thirty-two channel interface in a thirty-two channel format, forms a second and third plurality of channels from the first plurality of channels, and couples the second and third plurality of channels to the first and second twenty-four channel interfaces, respectively. The multiplexer/inverse multiplexer also receives a fourth and fifth plurality of channels at the first and second twenty-four channel interfaces, respectively, forms a sixth plurality of channels from the fourth and fifth plurality of channels and couples the sixth plurality of channels to the thirty-two channel interface. In addition, the multiplexer/inverse multiplexer demultiplexes at least one user channel from the second and third plurality of channels received at the first and second twenty-four channel interfaces, respectively, and couples the at least one user channel to the at least one standard network line interface, and multiplexes at least one user channel received at the at least one standard network line interface with either the second or third plurality of channels.

According to the present invention, a system for providing a thirty-two channel telecommunications interface to a customer while using two twenty-four channel telecommunication interfaces from a telephone network, includes a first multiplexer/inverse multiplexer with a first twenty-four channel interface, a second twenty-four channel interface, a thirty-two channel interface, and at least one standard user serial interface. In this case, the first multiplexer/inverse multiplexer receives a first plurality of channels at the thirty-two channel interface in a thirty-two channel format, forms a second and third plurality of channels from the first plurality of channels, and couples the second and third plurality of channels to the first and second twenty-four channel interfaces, respectively. The first multiplexer/inverse multiplexer also receives a fourth and fifth plurality of channels at the first and second twenty-four channel interfaces, respectively, forms a sixth plurality of channels from the fourth and fifth plurality of channels and couples the sixth plurality of channels to the thirty-two channel interface. In addition, the first multiplexer/inverse multiplexer demultiplexes at least one user channel from the second and third plurality of channels received at the first and second twenty-four channel interfaces, respectively, and couples the at least one user channel to the at least standard user serial interface, and multiplexes at least one user channel received at the at least one standard user serial interface with either the second or third plurality of channels. The above system also includes a second multiplexer/inverse multiplexer with a first twenty-four channel interface, a second twenty-four channel interface, a thirty-two channel interface, and at least one standard network line interface. In this case, the second multiplexer/inverse multiplexer receives a seventh plurality of channels at its thirty-two channel interface in a thirty-two channel format, forms an eighth and ninth plurality of channels from the seventh plurality of channels, and couples the eighth and ninth plurality of channels to its first and second twenty-four channel interfaces, respectively. The second multiplexer/inverse multiplexer also receives a tenth and eleventh plurality of channels at its first and second twenty-four channel interfaces, respectively, forms a twelfth plurality of channels from the tenth and eleventh plurality of channels and couples the twelfth plurality of channels to its thirty-two channel interface. In addition, the second multiplexer/inverse multiplexer demultiplexes at least one user channel from the eighth and ninth plurality of channels received at its first and second twenty-four channel interfaces, respectively, and couples the at least one user channel to its at least one standard network line interface, and multiplexes at least one user digital channel received at its at least one standard network line interface with either the eighth or ninth plurality of channels.

DETAILED DESCRIPTION

Figure 1:
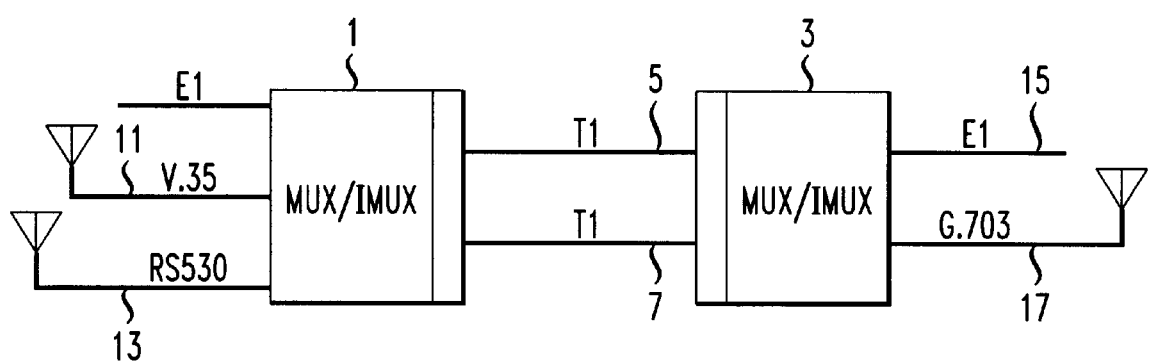
FIG. 1 depicts the system of the present invention.

Occasionally, customers request a 32 channel E1 interface to the telecommunications network even though the U.S. standard is a 24 channel T1 interface. Other than providing a 45 Megabit T3 line to the customer premise, the only other option is to provision two 1.544 megabit T1 (24 channels) lines, and inverse multiplex the customer's E1 signal onto the two T1 lines at the customer premises. At the network point-of-presence (POP), the applicable thirty-two channels of the two T1 lines are remultiplexed onto a single E1 line. The remaining sixteen channels of the two T1s are wasted.

To prevent wasting these channels, the present invention provides an additional standard customer interface to enable transport of multiple 64 kilobit applications. The resulting N×64 kbit data stream can then be multiplexed onto the two T1 lines transporting the E1 signal. The inverse multiplexer at the network point-of-presence (POP), while remultiplexing the 32 T1 channels onto an E1 line, also extracts the DSOs carrying the N×64 kbit customer payload and provides these DSOs a G.703 compliant network interface for multiplexing onto T1 or T3 lines for transport over the network.

Referring to FIG. 1, there is shown a multiplexer/inverse multiplexer (MUX/IMUX) 1 located at the customer premises (CP), and a second MUX/IMUX 3 located at the network POP. Interconnecting the MUX/IMUX 1 located on the CP and the MUX/IMUX 3 located at the network POP is a pair of T1 lines 5, 7 carrying 24 64 kbit per second digital channels. The input to the MUX/IMUX on the CP side is an E1 interface 9, and several standard user serial interfaces, such as a V.35 interface 11, and an RS530 interface 13. In general, the interfaces to the customer are standard user serial interfaces, such as V.35, RS530, RS232, etc. On the output side of the system depicted in FIG. 1, there is shown an E1 interface 15 being output by the MUX/IMUX 3 located on the network POP, and a standard network line interface 17, e.g. G.703 compliant interface 17.

The system operates as follows. The E1 channels from the customer premise equipment is multiplexed with the other 64 kbit digital channels onto the T1 lines in a format that is known to both the MUX/IMUX 1 and the MUX/IMUX 3. In some instances, this involves placing all of the channels on a single T1 line, until that line is full, while other instances this may involve alternating from one T1 line to another. Other modifications are possible. All that is required is that the two MUX/IMUXs multiplex the E1 channels and the DSOs similarly so that the receiving MUX/IMUX can extract the E1 channels and the DSOs and send them to the appropriate destination.

Then, the MUX/IMUX 3 receives the two T1 channels and separates the E1 channels from the others and sends the E1 channels to the network E1 interface, and the DSO channels to the G.703 compliant network interface for delivery over the network in accordance with the channel specifications.

The system operates similarly in reverse. E1 channels are received by the MUXI/MUX 3 along with DSOs from a G.703 compliant interface. The MUX/IMUX multiplexes the E1 channels with the DSOs into two T1 channels, as discussed above. The two T1s are received by the MUX/IMUX 1 located on the CP and inverse multiplexed to the E1 interface. The DSOs are output over the standard user serial interfaces 11, 13, such as V.35 or RS530, respectively.

While the present invention has been described in accordance with the above embodiment, other modifications are possible and would be apparent to those of skill in the art.

What is claimed is:

1. An apparatus for coupling a first plurality of channels received over a first telecommunications line to a pair of lower capacity telecommunications lines, in which a total capacity of the pair of lower capacity telecommunications lines exceeds the capacity of the first telecommunications line, said apparatus comprising:

a) a high capacity interface to the first telecommunications line for receiving the first plurality of channels in a first predetermined format;

b) two low capacity interfaces, one to each of the lower capacity telecommunications lines for outputting a subset of the first plurality of channels to each of the pair of telecommunications lines in a second predetermined format; and c) a digital channel interface for receiving a plurality of digital channels, wherein a total number of digital channels is less than or equal to a difference in the total capacity of the pair of lower capacity telecommunications lines and the capacity of the first telecommunications line;

d) a multiplexer being coupled between the high capacity interface and the two low capacity interfaces and selectively assigning channels from the first plurality of channels and the plurality of digital channels to each of the low capacity interfaces; and e) an inverse multiplexer being coupled between the high capacity interface and the two low capacity interfaces and demultiplexing a plurality of digital channels received from the two low capacity interfaces and forming a plurality of channels from any remaining channels and outputting them to the high capacity interface.

* * * * *